United States Patent [19]

Gerdt

[11] Patent Number: 5,028,801

[45] Date of Patent: Jul. 2, 1991

[54] APPARATUS AND METHOD FOR MULTIPLEXING FIBER OPTIC SENSORS

[75] Inventor: David W. Gerdt, Charlottesville, Va.

[73] Assignee: Sperry Marine Inc., Charlottesville, Va.

[21] Appl. No.: 465,717

[22] Filed: Jan. 16, 1990

[51] Int. Cl.$^5$ .............................................. H01J 5/16
[52] U.S. Cl. .......................... 250/227.12; 250/227.21
[58] Field of Search ..................... 250/227.11, 227.21, 250/227.12; 350/96.15, 96.16

[56] References Cited

U.S. PATENT DOCUMENTS

| | | | |
|---|---|---|---|
| 4,291,976 | 9/1981 | McMahon | 250/227.12 |
| 4,333,009 | 6/1982 | Stevens | 250/227.12 |
| 4,432,599 | 2/1984 | McMahon | 250/227.12 |
| 4,671,605 | 6/1987 | Soref | 350/96.16 |
| 4,829,165 | 5/1989 | Kalawsky | 350/96.16 |
| 4,870,269 | 9/1989 | Jelnhomme et al. | 250/227.12 |

Primary Examiner—David C. Nelms
Attorney, Agent, or Firm—Seymour Levine

[57] ABSTRACT

The pulsed input light source of the fiber-optic sensor array is divided into a plurality of input light sources for the respective sensors of the array by a network of low-loss single mode fixed ratio fiber-optic couplers. The input light is applied to the input fiber of a first fixed ratio coupler, the output fibers thereof providing the input fibers of further fixed ratio couplers and so forth until the light is divided into the appropriate number of sources. The divided light sources are applied to the input fibers of the variable ratio fiber-optic coupler sensors of the array through differing lengths of optical fiber so that the input light pulses impinge upon the sensors of the array at different times. The output fibers of the sensors are coupled to multimode busses through low-loss taps.

In an alternative embodiment for highly imbalanced ratio fiber-optic coupler sensors, the pulsed input light is applied to the input fiber of a first sensor. The high percentage output leg of the first sensor provides the input to a second sensor of the array, the high percentage output fiber thereof providing the input to the next array sensor. The low percentage legs of the sensors, which carry the information, are tapped into a multimode fiber-optic bus.

8 Claims, 2 Drawing Sheets

APPARATUS AND METHOD FOR MULTIPLEXING FIBER OPTIC SENSORS

BACKGROUND OF THE INVENTION

1. Field of the Invention

The invention relates to arrays of fiber optic sensors, particularly with respect to multiplexing arrangements therefor. The invention is specifically applicable to multiplexing arrays of variable coupler fiber optic sensors.

2. Description of the Prior Art

The variable coupler fiber optic sensor is adaptable for a variety of parameters such as temperature, pressure, sound and the like. The sensor is described in U.S. Pat. No. 4,634,858, issued Jan. 6, 1987, entitled "Variable Coupler Fiber Optic Sensor" and assigned to the assignee of the present invention. Said U.S. Pat. No. 4,634,858 is incorporated herein by reference. Applications of the sensor are disclosed in U.S. patent application Ser. No. 376,342, filed July 6, 1989, entitled "Variable Coupler Fiber Optic Sensor Hydrophone", by David W. Gerdt; and Ser. No. 444,920, filed Dec. 4, 1989, entitled "Method of Monitoring Cardiovascular Signals and Fiber Optic Coupler Phonocardio Sensor Therefor", by David W. Gerdt. Said Ser. Nos. 376,342 and 444,920 are assigned to the assignee of the present invention and are incorporated herein by reference.

Briefly, as described in said U.S. Pat. No. 4,634,858, the sensor comprises a plurality of input optical fibers, each having a core, the cores of the optical fibers being merged and fused in a waist region to form a common optical core wherefrom a plurality of output optical fibers emerge. Light energy from, for example, a laser or light emitting diode incident to one of the input fibers is distributed to the plurality of output fibers. The waist region is encapsulated in material having a refractive index variable with stress applied thereto and the applied stress varies the distribution of output light energy. A differential detector such as a plurality of photodiodes is coupled to the output fibers for providing signals representative of the optical energy distribution in the output fibers. The sensor may be constructed in accordance with teachings in U.S. patent application Ser. No. 240,986, filed Sept. 6, 1988, entitled "Fiber Optic Fabrication Furnace", by David W. Gerdt. Said U.S. patent application Ser. No. 240,986 is assigned to the assignee of the present invention and is incorporated herein by reference.

Thus, a sensor includes at least one input fiber requiring a light source and generally two output fibers coupled to a detector for providing a signal related to the physical parameter being sensed.

It is often desirable to configure such sensors into arrays such as linear arrays or nets of plural sensors, each requiring a light source and output detectors. For example, an array of hyrophone sensors may be mounted on the outer hull of a marine vessel such as a submarine or an array of pressure sensors may be utilized to detect levels of liquids such as in oil tankers. In such arrays, it is desirable to minimize the number of input and output leads so as to minimize hull penetration fittings. Independent sensors for constructing such arrays, each sensor requiring a separate light source and detector, results in excessive complexity and cost.

It is a desideratum to reduce the large number of input and output fibers from individual sensors utilized in such arrays. A variety of techniques are known in the art for multiplexing a plurality of fiber optic sensors of types other than the variable coupler fiber optic sensor, such as the interferometric type. The prior art does not provide a useful multiplexing configuration for the variable coupler fiber optic sensor. It is believed that the prior art does not provide a useful multiplexing configuration for fiber optic sensors of the intensity type such as the micro-bending sensor.

Configurations for multiplexing fiber optic sensors of the interferometric type are discussed in "Fiber-Optic Multisensor Networks", SPIE Proceedings, Volume 985, (1988) by Kersey and Dandridge. Such multiplexing configurations are undesirably complex since interferometric sensors require preservation of precise phase information. A reference leg and a sensor leg are always required for Michelson and Mach-Zehnder sensors. Additionally, interferometric sensors are difficult to deploy and are extremely expensive.

SUMMARY OF THE INVENTION

A single light source provides the input to each sensor of an array of fiber optic sensors. Light from the source is launched into a tree of fixed ratio fiber optic couplers that divides the light into plural light sources for the sensors of the array. The source light is launched into one input fiber of a first fixed ratio fiber optic coupler which divides the light energy between the output fibers thereof. Further, fixed ratio fiber optic couplers receiving input light from the outputs of the first coupler further subdivide the light from the first coupler until the desired number of sensor input sources are generated. The sensors of the array receive the input light with relative delays therebetween. The output fibers of the array sensors are tapped into multimode busses to maintain time separation between the sensor outputs. The outputs of the multimode busses are coupled to detectors for providing the array outputs. Preferably, the array sensors comprise variable ratio fiber optic coupler sensors.

An alternative embodiment of the invention utilizes a linear array of highly imbalanced variable ratio fiber optic coupler sensors where the high light output fiber of each sensor is coupled to the input fiber of the next sensor in the array. The low light output fiber of each sensor provides the sensed data and is tapped into a multimode bus. Light is launched into the input fiber of the first sensor in the array.

DESCRIPTION OF THE PREFERRED EMBODIMENT

Figure 1:
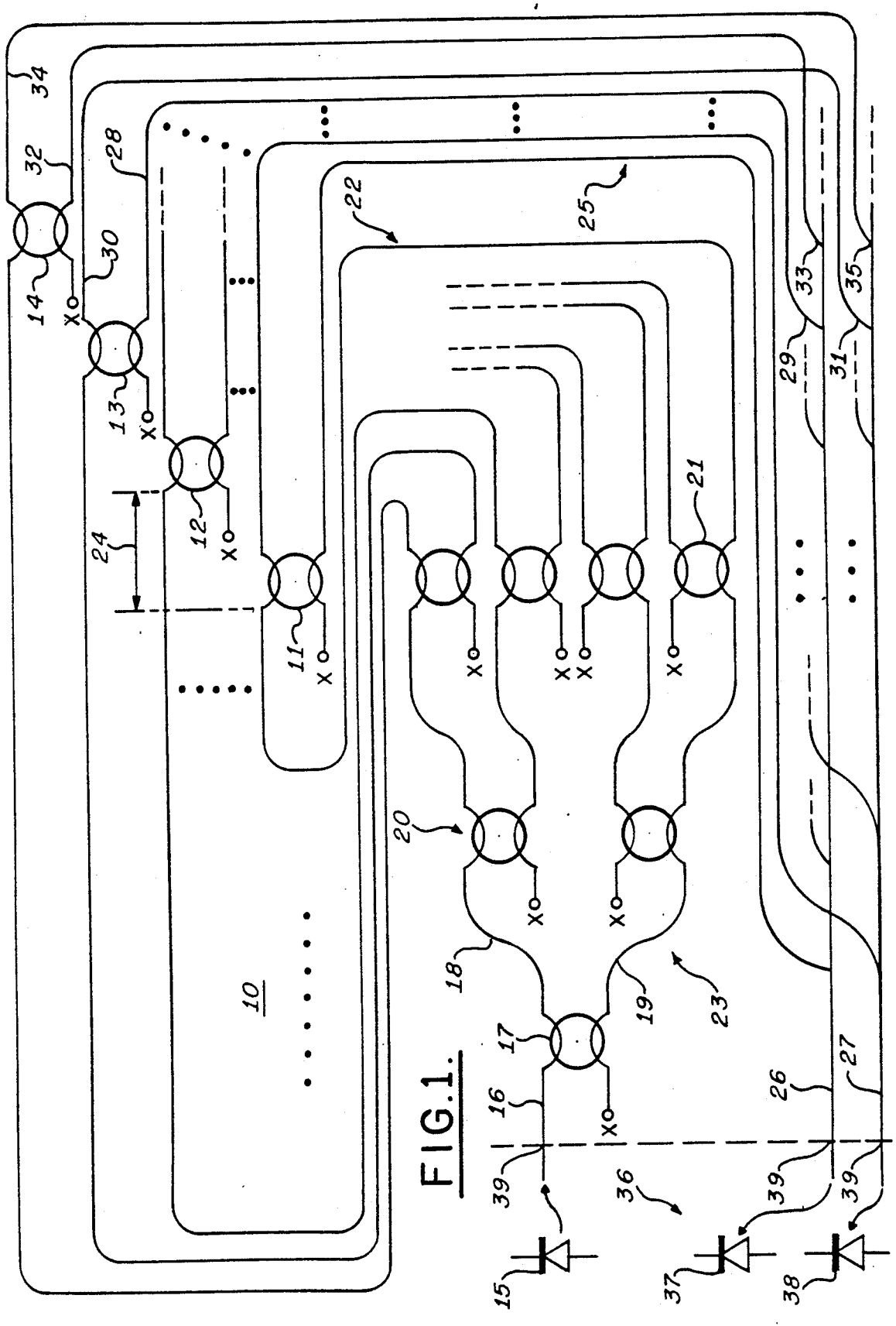
FIG. 1 is a schematic representation of the multiplexing configuration of the present invention utilizing a tree of fixed ratio fiber optic couplers.

Referring to FIG. 1, a multiplexing configuration for an array 10 of variable ratio fiber optic coupler sensors 11–14 is illustrated. Each of the sensors 11–14 is of the type described in the above-referenced U.S. patent and U.S. patent applications and forms an extended array of coupler sensors. The input optical energy for each of the sensors 11–14 of the array 10 is provided by an optical source 15. The optical source 15, for example, comprises a pulsed light emitting diode or pulsed laser diode appropriately pigtailed to input fiber 16 of a low-loss, fixed ratio, environmentally insensitive fiber optic coupler 17. The coupler 17 functions as a stable fiber optic beamsplitter dividing the pulsed light that is coupled or launched into the input leg 16 into light pulses on output fibers 18 and 19. The coupler 17 preferably provides a division ratio into the output fibers 18 and 19 of approximately 50:50 and is generally of the type described in said U.S. Pat. No. 4,634,858, except that the division ratio into the output fibers is fixed. A stable fixed ratio coupler may be implemented if the sensor of said U.S. Pat. No. 4,634,858 is not encapsulated in stress sensitive encapsulant. Preferably, an ultra-low loss etched coupler may also be utilized. The output fibers 18 and 19 of the coupler 17 form input fibers to further fixed ratio couplers 20, the output fibers of which form the input fibers of still further fixed ratio couplers 21. Output fibers 22 of the couplers 21 form the input fibers of the sensors of the array 10. Each of the couplers 20 and 21 is identical to the coupler 17 and comprises a single mode fiber optic coupler.

Thus, the couplers 17, 20 and 21 form a beamsplitter network or tree 23 functioning to divide the pulse from the light source 15 into as many light sources on the fibers 22 as required for input into the array 10. The light pulses propagating through the couplers 21 simultaneously exit the network 23 on the fibers 22. Each of the fibers 22 forms the input fiber to one of the variable ratio coupler sensors 11-14.

Sensors of the array 10 are spaced at varying distances from the network 23 so that light pulses on the fibers 22 arrive at respective sensors of the array 10 at different times. The relative delays of the input pulses to the sensors 11-14 are controllable by varying the relative distances of the sensors 11-14 from the network 23 or by inserting conventional fiber optic delay lines between the sensors 11-14 and the network 23. A fiber optic delay line may be implemented by a length or coil of fiber which increases the propagation time of a light pulse to the input of a sensor. For example, the relative delay between the sensors 11 and 12 results from a fiber length 24.

As described in the previously referenced U.S. patent and patent applications, a ratio change of the light output occurs at each of the sensors of the array 10 which change is related to the physical parameter being sensed, for example, acoustic energy, temperature, pressure and the like. At each of the sensors 11-14, a single pulse enters the sensor and two pulses, split by the coupler sensor exits on output fibers 25 therefrom. The ratio of the exit pulses from a sensor contains the information with respect to the physical parameter being measured. The sensor exit pulses travelling along the fibers 25 are conveyed to multimode bus or trunk fibers 26 and 27. The sensor exit pulses enter the trunks 26 and 27 at low-loss taps. Thus, each of the taps launching exit pulses into the trunks 26 and 27 couples the single mode output fibers from the sensors 11-14 into the multimode trunks 26 and 27. For example, an output fiber 28 of the sensor 13 launches the exit pulses thereon into the trunk 26 at a tap 29 and an output fiber 30 from the sensor 13 launches the pulses travelling thereon into the trunk 27 at a tap 31. In a similar manner, output fibers 32 and 34 of the sensor 14 launch the exit pulses thereof into the trunks 26 and 27 at taps 33 and 35, respectively. Because time delays have been introduced between the exit pulses from the respective sensors 11-14, no mixing of the pulses on the trunks 26 and 27 occurs. The trunk lines 26 and 27 convey the temporally ordered pulses to detectors 36 which preferably comprise a plurality of photodiodes 37 and 38. Thus, the multimode trunks 26 and 27 convey the information sensed by the coupler sensors 11-14 to the detectors 36. The receiver photodiodes 37 and 38 convert the optical energy of the pulses to electrical energy to provide an electrical signal representative of the physical parameter sensed by the sensors of the array 10. Circuitry not shown performs electrical amplification and information processing as required.

The temporal spacing between the pulses on the trunks 26 and 27 can be adjusted by utilizing delay lines. Additionally, the pulse repetition frequency of the sensor pulses into the detection circuitry 36 can be varied so as to match the data processing capabilities of the detection circuitry as a function of the distance between sensors.

In an alternative arrangement, one of the multimode trunks 26 and 27 can be tapped into the other trunk thus eliminating one output lead with a concomitant elimination of detection circuitry. With this arrangement, storage is required within the detection circuitry 36 to store the first to exit pulse of a pulse pair from a sensor so that ratio processing can be performed. With this arrangement, the multiplexed array has only one input fiber and one output fiber.

When the arrangement of FIG. 1 is utilized to implement an array for use with marine vessels, only two or three hull penetration fittings depicted at 39 are required. The above-described process is a form of time division multiplexing.

Figure 2:
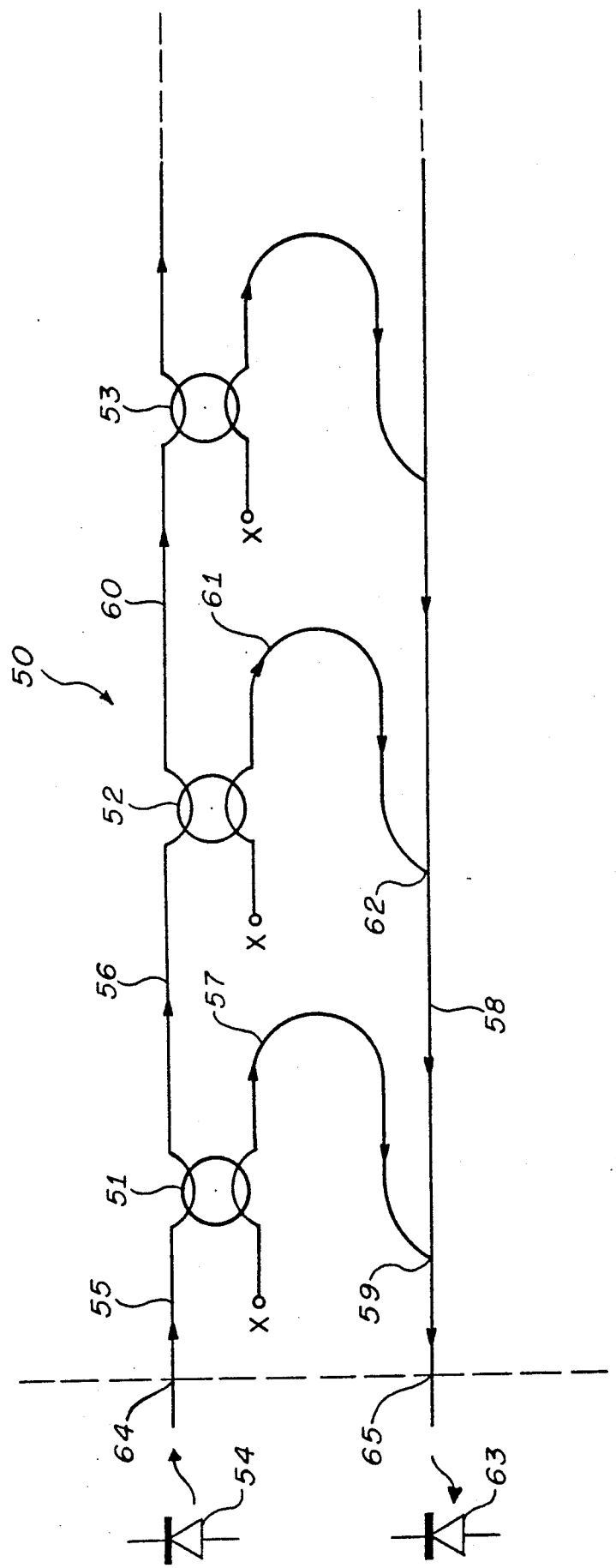
FIG. 2 is a schematic representation of an alternative multiplexing configuration for an array of highly imbalanced variable ratio fiber optic coupler sensors.

Referring to FIG. 2, a multiplexing configuration for use with variable ratio fiber optic coupler sensors having highly unbalanced output ratios is illustrated. As generally described in the above-referenced U.S. patent and patent applications, the sensor output ratio for a null stress field can be set during the sensor fabrication process to a desired ratio. A highly unbalanced ratio such as 95:5 or 97:3 may be obtained in order to provide a simplified multiplexing arrangement. Generally for such unbalanced coupler sensors, it is still possible to obtain the necessary information signal which is adequately conveyed by the output fiber with the low ratio factor. The output fiber with the large ratio factor exhibits negligible relative variation in the presence of a varying stress field and is therefore relatively insensitive. Thus, the output fiber with the large ratio factor provides light output power that is relatively constant and clean and can be provided as a light source into another coupler sensor. The information pulses on the output fibers having the low ratio factor can be collected onto a multimode bus.

FIG. 2 illustrates a linear array 50 of highly unbalanced variable coupler fiber optic sensors 51-53. Light pulses from a suitable light source 54, such as a light emitting diode or laser, is launched into an input fiber 55 of the sensor 51. The sensor 51 may be unbalanced with a ratio of 98:2. Thus, the sensor 51 divides the light energy on the input fiber 55 into approximately 98% on an output fiber 56 and approximately 2% on an output fiber 57. Disregarding unrecoverable excess loss, the sensor 51 transduces variations in the parameter measured into optical variations. The optical variations occur as relatively large amplitude variations on the 2% leg 57 compared to the total amount of light on the leg 57. Variations also occur on the 98% leg 56 but these variations are small compared to the total amount of light present on the leg 56. Thus, the light from the leg 56 is relatively constant and clean and is therefore suitable as the light source for the input fiber of the following sensor 52. The output fiber 57 is coupled to a multimode bus 58 at a low loss tap 59.

Thus, the output fiber 56 of the sensor 51 is applied as the input fiber to the sensor 52 which, for example, may be configured to have a ratio of 96:4. Thus, an output fiber 60 from the sensor 52 conveys approximately 96% of the light energy therefrom and an output fiber 61 conveys approximately 4% of the light energy therefrom. The output fiber 61 is coupled to the multimode bus 58 at a low loss tap 62. Since the sensor 51 receives more input light than the sensor 52, but the information leg 61 of the sensor 52 has a larger ratio factor than the information leg 57 of the sensor 51, approximately the same amount of optical energy is provided by the sensors 51 and 52 into the trunk 58 at the taps 59 and 62.

In a manner similar to that described, the output fiber 60 from the sensor 52 forms the input fiber to the sensor 53 which may be constructed to provide a ratio of 93:7. The sensor following the sensor 53 may be constructed with a ratio of 89:11 and so on until the large ratio factor leg of a sensor does not provide a sufficiently large, unvarying and clean signal to provide to the next coupler sensor. It is appreciated that in the example given, the percentage differences between successive sensors is 2, 3, 4, ... until the light output from the large ratio factor leg deteriorates so as not to be useable as the input source to a further sensor.

Thus, each of the coupler sensors 51-53 of the array 50 is powered by optical energy received by a previous sensor or by the input source 54. The low ratio factor output fibers from the sensors 51-53 comprise single channels from the respective sensors conveying information from the sensors to the multimode trunk 58 at the tap points therein. Thus, each of the taps 59, 62, ... comprises a tap from a single mode sensor output fiber into the multimode trunk 58.

The pulsed optical source 54 is utilized in a time division multiplexed mode since the coupler sensors 51-53 are spaced apart in distance and therefore in time. A detector 63, such as a photodiode detector, receives all of the time separated pulses from the sensors of the array 50 travelling along the bus 58 and converts the optical energy thereof to electrical energy which provides the output signals of the array 50.

If the array 50 is utilized external to the hull of a marine vessel, the electrical energy provided to the array 50 at the source 54 and received from the array 50 at the detector 63 may originate and be received at an internal ship location remote from the location of the array. The input fiber 55 and the multimode output trunk 58 enter the interior of the ship at hull penetration fittings 64 and 65. The electrical signal from the detector 63 may be amplified and processed as necessary at the remote location.

In a comparison of the configuration of FIG. 2 with that of FIG. 1, it is appreciated that each of the sensors of FIG. 2 provides a single fiber output whereas the sensors of FIG. 1 provide dual outputs. Although in FIG. 2, the benefits of a differential dual output are lost, a simplicity results by eliminating the single mode, low-loss coupler beamsplitting network 23, eliminating one of the photodiode receivers, eliminating many connections and eliminating a significant amount of optical fiber. It is appreciated that in the above-described configurations, single mode coupler sensors tapping into multimode trunks result in a total loss of coupler sensor signal and throughput trunk signal of less than 0.1%. All phase information is, however, lost on the multimode return trunk. Consequently, the described multiplexing configurations cannot be used with interferometric sensors. Interferometric sensors, on the other hand, must utilize single mode couplers to multiplex onto a single mode trunk in order to preserve phase information. Sensor signal and trunk throughput losses resulting from optical coupler division ratios severely limit the number of interferometric sensors that can be multiplexed utilizing known multiplexing configurations for such sensors.

The above-described invention applies to all-optical, fiber-optic sensors that are optically coupled together via fiber-optic light-guides into an array. The present invention permits a plurality of sensors to be multiplexed into a multisensor array where the array has a minimum of input and output fibers. The couplers of the network 23 of FIG. 1 introduce negligible losses and partition the pulsed light from a single source to provide light to plural sensors. Fiber optic delay lines provide temporal separation of the pulses to any desired extent which decreases the capabilities required of the electronic signal processing circuitry. Since the output pulses from the sensors are not phase sensitive, multimode fiber trunks with low-loss taps can be utilized.

The low loss taps of the sensor output fibers into the multimode busses may be of any suitable known design. Such suitable taps are described in documentation available from the Ensign-Bickford Optics Company, 16-18 Ensign Drive, P.O. Box 1260, Avon, Conn., with respect to the EBOC Linear Tap System.

It is appreciated that although the invention is described in terms of variable coupler fiber-optic sensors, the invention is also applicable to single sourced sensors such as the microbending sensor. The invention provides simple and inexpensive configurations to multiplex intensity-type fiber-optic sensors into arrays. In addition to the uses described above, such arrays may also be utilized in oil exploration, intrusion detection, and other appropriate applications.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A multiplexed array of fiber-optic sensors, each of the type wherein light coupled to an input fiber divides between first and second output fibers in accordance with applied stress, comprising:
   a source of input light;
   coupling means coupled between said source and said input fibers for providing sensor input light at different arrival times, respectively, to said input fibers;
   first fiber-optic bus means coupled to said first output fiber of said sensors for guiding light signals coupled thereto;
   second fiber-optic bus means coupled to said second output fiber of said sensors for guiding light signals coupled thereto; and
   light detector means optically coupled to receive light signals from said first and second fiber-optic bus means for converting received light signals to electrical signals respectively representative of stress applied to said sensors.

2. The array of claim 1 wherein said coupling means includes fixed ratio fiber-optic couplers each having an input fiber and a plurality of output fibers.

3. The array of claim 2 wherein said coupling means comprises:
a first fixed ratio fiber-optic coupler having an input fiber coupled to said source and first and second output fibers; and
further fixed array fiber-optic couplers having input fibers coupled to said first and second output fibers of said first fixed ratio fiber-optic coupler.

4. The array of claim 1 wherein said coupling means comprises a tree of fixed ratio fiber-optic couplers with a first fixed ratio fiber-optic coupler a root thereof, said tree including successive groups of fixed ratio fiber-optic couplers, each group having input fibers coupled to output fibers of a preceding group, a last group providing said sensor input light from output fibers thereof.

5. The array of claim 1 wherein said coupling means includes optical fibers having different lengths respectively coupled to said fiber optic sensors.

6. The array of claim 1 wherein said source of array input light comprises a source of light pulses.

7. The array of claim 1 wherein said fiber optic sensors divide light unequally between said first and said second output fibers when subjected to a null stress and wherein said first output fiber of one of said sensors is coupled to an input fiber of another of said sensors via said first fiber-optic bus means and wherein said second output fibers of said sensors are coupled to said second bus means.

8. The array of claim 7 wherein null stress division of light between said first and second output fibers of said one of said sensors is of a ratio greater than null stress division of light between said first and second output fibers of said another of said sensors.

* * * * *